(12) United States Patent
Yasue et al.

(10) Patent No.: US 6,363,521 B1
(45) Date of Patent: Mar. 26, 2002

(54) PROCESS FOR PROCESSING PROGRAMS, PROCESS FOR DETECTING DEPTH OF FRAME ASSOCIATED WITH SPECIFIED METHOD, DETECTION METHOD, AND COMPUTER

(75) Inventors: Toshiaki Yasue, Sagamihara; Hideaki Komatsu, Yokohama; Takeshi Ogasawara, Hachioji, all of (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/306,007

(22) Filed: May 6, 1999

(30) Foreign Application Priority Data

May 11, 1998 (JP) .......................................... 10-127024

(51) Int. Cl.$^7$ ................................................. A61F 2/24
(52) U.S. Cl. ................................................. 717/4; 717/9
(58) Field of Search ................................ 717/4, 5, 6, 7, 717/8, 9; 709/310, 315, 316, 107; 707/206; 711/132, 147

(56) References Cited

U.S. PATENT DOCUMENTS

| | | | | |
|---|---|---|---|---|
| 5,812,850 A | * | 9/1998 | Wimble | 395/704 |
| 6,047,125 A | * | 4/2000 | Agesen et al. | 395/709 |
| 6,101,326 A | * | 8/2000 | Mattson, Jr. | 395/709 |
| 6,192,517 B1 | * | 2/2001 | Agesen et al. | 717/9 |
| 6,199,095 B1 | * | 3/2001 | Robinson | 709/107 |
| 6,226,789 B1 | * | 5/2001 | Tye et al. | 717/7 |

OTHER PUBLICATIONS

Tarditi et al., "No assembly required: Compiling standard ML to C", ACM, 1992, pp. 161–177.*
Zhou et al., "Parameter passing and control stack management in Prolog implementation revisited", ACM, 1996, pp. 752–779.*

* cited by examiner

*Primary Examiner*—Kakali Chaki
(74) *Attorney, Agent, or Firm*—Scully, Scott, Murphy & Presser; Casey P. August

(57) ABSTRACT

The present invention is directed to expanding the scope of execution optimization by method inlining in a language with a security facility such as Java. More particularly, the present invention is directed to a step of generating a code necessary for looping by a tail recursion for a first method including an invocation of a method whose process after its invocation is indefinite and which includes a self recursion, and a step of generating a code for counting the number of iterations of the loop are included. SecurityManager corrects the depth of the frame associated with a second method in the storage area by using the count value by the code for counting the number of iterations of the loop. It also includes the steps of: inlining a code of the first method into the second method, wherein the second method includes an invocation of the first method whose process after its invocation is indefinite; getting the invocation relationship information between the first and the second methods in a state before inlining the code of the first method, and storing the invocation relationship information into a storage area available later; and generating a code for storing information about the first method being executed when the code of the inlined first method is executed. SecurityManager traces the stack with generated invocation relationship information.

24 Claims, 6 Drawing Sheets

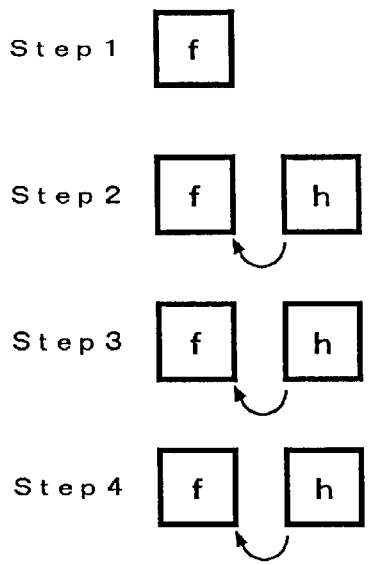
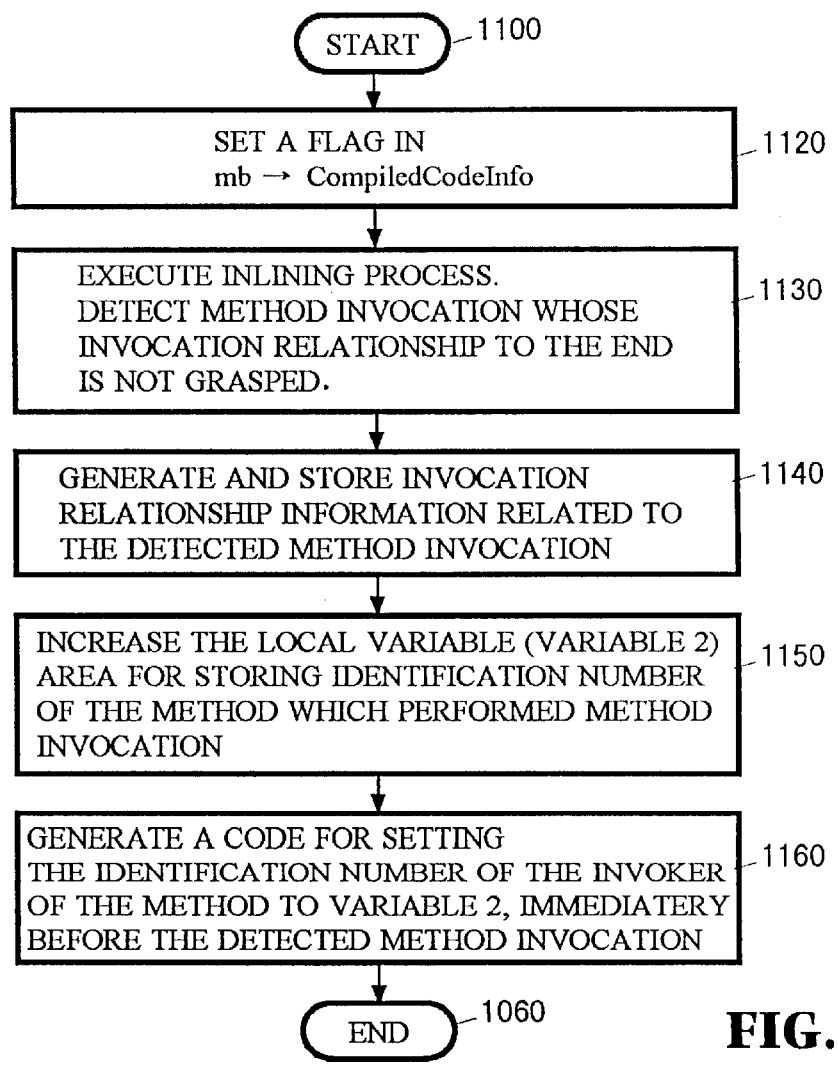
FIG. 6
FIG. 7

PROCESS FOR PROCESSING PROGRAMS, PROCESS FOR DETECTING DEPTH OF FRAME ASSOCIATED WITH SPECIFIED METHOD, DETECTION METHOD, AND COMPUTER

BACKGROUND OF THE INVENTION

1. Technical Field

The present invention relates to a method inlining in a compiler, particularly to a method inlining in Java (a trademark of Sun Microsystems) JIT (Just In Time) compiler, etc.

2. Prior Art

Java includes a security check facility in its language, wherein SecurityManager class comprises the following five methods:

(1) getClassContext

This is a method for returning as an array a class which a method corresponding to each frame on a stack belongs to. A frame is a storage area which stores information generated when a method is executed, about the method generated.

(2) currentClassLoader

This method returns a class loader itself of the newest class which has a class loader and which a method corresponding to a frame on a stack belongs to. A class loader is a class comprising a group of methods used to load classes which are not yet loaded. The newest means most recently executed.

(3) currentLoadedClass

This method returns the newest class which has a class loader and which a method corresponding to a frame on a stack belongs to.

(4) currentDepth

This method returns the depth in a stack of a frame corresponding to the newest method belonging to the same class as the specified one.

(5) classLoaderDepth

This method returns the depth of a frame in a stack, wherein the frame corresponds to a method belonging to the newest class with a class loader.

These methods acquire necessary information by tracing the stack. On the other hand, method inlining takes a code of the invoked method into the invoking side at the time of compiling instead of invoking a method at the time of execution to remove method invocation. Accordingly, there is no execution information generated as to any method which is already inlined. If any method of SecurityManager class is included in any code of inlined methods or in any method invoked from the inlined method, there arises a problem that the behavior of the program may change because they don't return the correct results. Thus, conventionally method inlining was executable only if it is assured that invocation relationship to the end is completely grasped and such method invocations do not include any call to a method of SecurityManager class.

In an object oriented language such as Java, messages are easily overloaded. Accordingly, while it has high reusability and flexibility as a module, it is almost difficult for a compiler to perform analysis which enables the aforementioned assurance. Java allows a final descriptor to be affixed to a special method. This "final" means being at the end and not to be overloaded. If the final attribute is not specified, a generally used virtual method invocation cannot specify an invoked code since it may be overridden. If method inlining is performed based on the final attribute, however, the extent to which method inlining is applicable is limited due to the following status. (a) A general programmer seldom uses the final attribute, and (b) even if the creator of a program recognizes it as a method invocation not to be overridden, in many cases there is no explicit designation of the final attribute.

Meanwhile, "a method invocation wherein invocation relationship to the end is completely grasped" is a method invocation wherein an invoked method is not a native method and is invoked by either a static invocation, a non-virtual invocation or a virtual method invocation with the final attribute. The native method is a method written in a language other than Java such as C and consists of a compiled code. Also, the static invocation is an invocation for a method defined with a static descriptor affixed (static method). The static method is a method for invocation without using an object, not overloaded by any other method. Accordingly, it is always possible in a static invocation to uniquely decide an executed method.

Accordingly, an object of the present invention is to expand the scope of execution optimization by method inlining in a language with a security facility such as Java.

It is also an object to enable method inlining in Java's JIT (Just In Time) compiler.

In addition, it is also an object to enable stack information in a state where method inlining is not executed to reappear, when method inlining is executed.

It is also an object, in a language such as Java, to enable looping by a tail recursion for a method including an invocation of a method whose process after its invocation is indefinite and which includes a self recursion.

Furthermore, it is also an object to enable grasping of the number of iterations in the looping.

It is also an object to enable preservation of the invocation relationship information between methods before method inlining, when method inlining is executed.

It is also an object to enable determination of which method's code is being executed when method inlining is executed.

SUMMARY OF THE INVENTION

To accomplish the above objects, the present invention has the following aspects. The first aspect comprises the steps of: generating a code necessary for looping by a tail recursion for a method including an invocation of a method whose process after its invocation is indefinite and which includes a self recursion; and generating a code for counting the number of iterations of the loop. By executing a program including such codes, the number of iterations of the loop can be counted so that a depth of a stack may be corrected when SecurityManager operates. Accordingly, in a language such as Java, it is also possible to attempt optimization by means of looping by a tail recursion.

The step of generating the code for counting the number of iterations of the loop may include a step of generating a work area on a stack when executing the program. It is also possible to generate a code for initializing the count of the number of the iterations of the loop before the code necessary for looping. In addition, it may also include a step of setting a flag which represents generation of a code necessary for looping in order to facilitate detection of this process being executed when SecurityManager operates.

On the other hand, if a program including an invocation of a method whose process after its invocation is indefinite and which includes a self recursion is executed, wherein the program includes a first method which includes a code necessary for looping by a tail recursion and a code for counting the number of iterations of the loop, in order to detect a depth of a frame associated with a specified method which satisfies a predetermined condition in a storage area storing information with respect to executed methods as corresponding frames, SecurityManager executes the steps of: determining whether a second method associated with a currently examined frame in the storage area is the specified method; if the second method is not the specified method, determining whether the second method is the first method; and if the second method is the first method, correcting the depth of a frame in the storage area associated with the second method by using the count value by the code for counting the number of iterations of the loop. By doing so, there will be no influence when method inlining by a tail recursion is performed. By correcting by the count value, it enables stack information in a state where inlining is not performed to reappear.

Moreover, if the second method is the specified method and a frame associated with the first method is already examined before examining a frame associated with the specified method, it further executes a step of returning a depth from an earliest frame in the storage area to a frame associated with the second method, wherein the depth is corrected by the count value in the first method. This is the process in the event of tracing a stack more deeply than in the previous paragraph.

In addition, if the second method is not the first method, it may further execute a step of adding 1 to the depth and changing the second method to a method associated with a next frame. Stack trace is performed until the specified method is detected or tracing of all the frames in the stacks is complete.

Meanwhile, if the first method includes a flag representing that it includes a code necessary for looping, it is sufficient to check whether or not there is the flag when determining if the second method is the first method.

The second aspect of the present invention comprises the steps of: inlining a code of a first method to a second method including an invocation of the first method whose process after its invocation is indefinite; getting the invocation relationship information between the first and the second methods in a state before inlining the code of the first method, and storing the invocation relationship information into a storage area available later; and when the code of the inlined first method is executed, generating a code for storing information about the first method being executed. Accordingly, when SecurityManager operates, it becomes possible to determine the invocation relationship between the methods in a state before method inlining and which method's code is being used, which expands the scope of execution optimization by method inlining.

In order to distinguish from the first method, it is also possible, when executing a code included in the second method before inlining, to further include a step of generating a code for storing information about the second method being executed. In addition, as to the invocation relationship between the first and the second methods, it is also possible that an item associated with the first method include a pointer pointing at an item associated with the second method.

If a program including a plurality of methods is executed, wherein the plurality of methods include a first method and a second method, and the second method includes an invocation of the first method whose process after its invocation is indefinite, and the second method includes a code of the first method by the method inlining and a code for storing information about the first method being executed when the code of the inlined first method is executed, and the program includes the invocation relationship information between the first and the second methods in a state before inlining the code of the first method, in order to detect a frame associated with a specified method which satisfies a predetermined condition in a storage area storing information with respect to executed methods as corresponding frames, SecurityManager executes the steps of: determining whether a third method associated with a currently examined frame in the storage area is the second method; if the third method is the second method, getting the invocation relationship information associated with the second method; getting a corresponding item of the third method in the invocation relationship information; by using the corresponding item of the third method, getting an invoking method of the third method; and determining whether the invoking method is the specified method. By doing so, the influence of method inlining is removed since it enables stack information in a state where inlining is not performed to reappear even when method inlining is performed.

Moreover, if the invoking method is not the specified method, a step may be executed to get a further invoking method from the corresponding item of the invoking method in the invocation relationship information. Similar to the first aspect, stack trace is performed until the specified method is detected or tracing of all the frames in the stacks is complete.

Meanwhile, both the first and the second aspects of the present invention assume that they are performed for Java's bytecode by a JIT compiler while it is also possible to be executed for an intermediate code in a JIT compiler. Also, in case of other languages, it is possible to execute it for a program written by a programmer by a normal compiler.

While the processing flow of the present invention has been explained as above, it is also possible to implement the present invention by the devices for performing such processes or a program to have a computer execute such processes. It is a normal practice for the one having ordinary skills in the art to store this program in a storage medium such as a floppy disk or a CD-ROM or any other storage devices.

BRIEF DESCRIPTION OF THE DRAWINGS

Preferred embodiments of the present invention will now be described, by way of example only, with reference to the accompanying drawings in which:

FIG. 6 is a diagram showing the stack status in Embodiment 2.

FIG. 7 is a flowchart showing the processing of JIT compiler in Embodiment 2.

DETAILED DESCRIPTION OF THE PREFERRED EMBODIMENTS OF THE INVENTION

Figure 1:
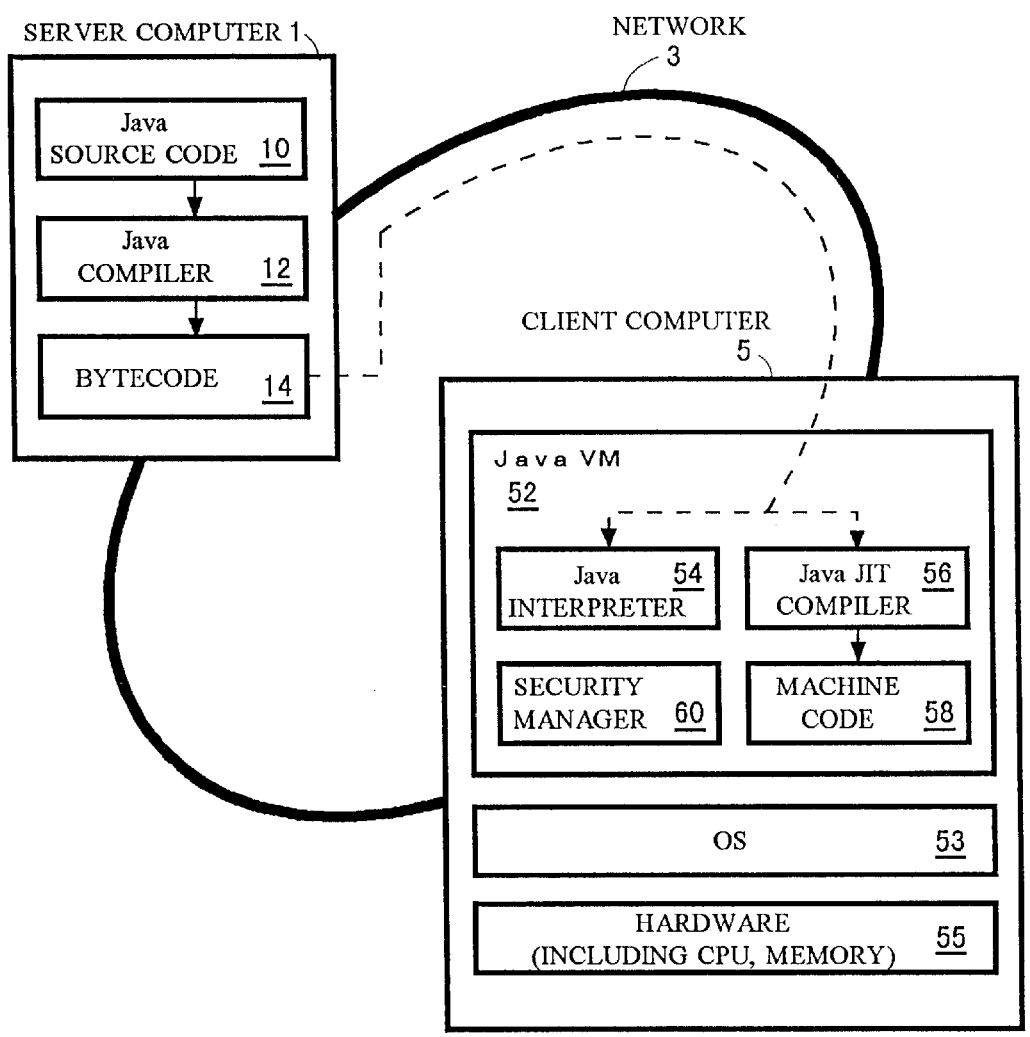
FIG. 1 is a diagram showing an apparatus configuration according to the present invention.

Device configuration of the present invention is explained by using FIG. 1. Server computer 1 and client computer 5 are connected via network 3. Client computer 5 includes Java VM (Virtual Machine) 52 and OS (Operating System) 53 and hardware (including CPU and memory) 55. In addition, Java VM 52 includes Java interpreter 54 or Java JIT compiler 56 and SecurityManager 60. It may include both interpreter 54 and JIT compiler 56. Moreover, client computer 5 may be, in addition to an ordinary computer, so-called a network computer or an information electric household appliance which may have a small-sized memory or may not include a sub-storage such as a hard disk.

In server computer 1, Java source code 10 is compiled by Java compiler 12. The result of this compilation is bytecode 14. This bytecode 14 is transferred to client computer 5 via network 3. Bytecode 14 is a native code for Java virtual machine (Java VM) 52 provided in a WWW (World Wide Web) browser in client computer 5, etc., and Java interpreter 54 or Java JIT compiler 56 is used when actually executed by hardware 55's CPU. Interpreter 54 decodes bytecode 14 when executed, and invokes and executes a process routine provided for each instruction. On the other hand, JIT compiler 56 converts a bytecode to machine code 58 using compiler in advance or just before execution and execute it by CPU.

The present invention relates to processing of JIT compiler 56 in FIG. 1. The processing flow is illustrated as follows.

(1) Embodiment 1 (Looping by a Tail Recursion)

Table 1 shows a sample program. Actually, processing is executed in terms of a bytecode, it is represented by a pseudocode as follows since a bytecode is not easy to understand.

TABLE 1

```
10:    class test {
20:        public final int f( int x )
30:        {
40:            if(x==0) {
50:                return 0;
60:            } else
70:                h(x);
80:                return f(x-1);
90:        }
100:    }
110:    public void h( int x )
120:    {
130:        ......
140:    }
150: }
```

The line numbers are only for the purpose of explanation.

The sample code of Table 1 shows method f having the final attribute (lines 20 to 100) and method h invoked from method f (line 70) without the final attribute (lines 110 to 140). It further shows a self recursion in method f (line 80).

If looping by a tail recursion is preformed to this according to a conventional method, it will be as follows.

TABLE 2

```
200:    class test {
210:        public final int f( int x)
220:        {
230:            for (;;) {
                //a code for looping generated by Tail Recursion
240:                if(x==0) {
```

TABLE 2-continued

```
250:                return 0;
260:            } else {
270:                h(x):
280:                    x=x-1;
                //a processing code generated by Tail Recursion
290:            }
300:        }
310:    public void h( int x )
320:    {
330:        ......
340:    }
350: }
```

In lines 230 and 280, a code necessary for looping by tail recursion was generated.

Figure 2:
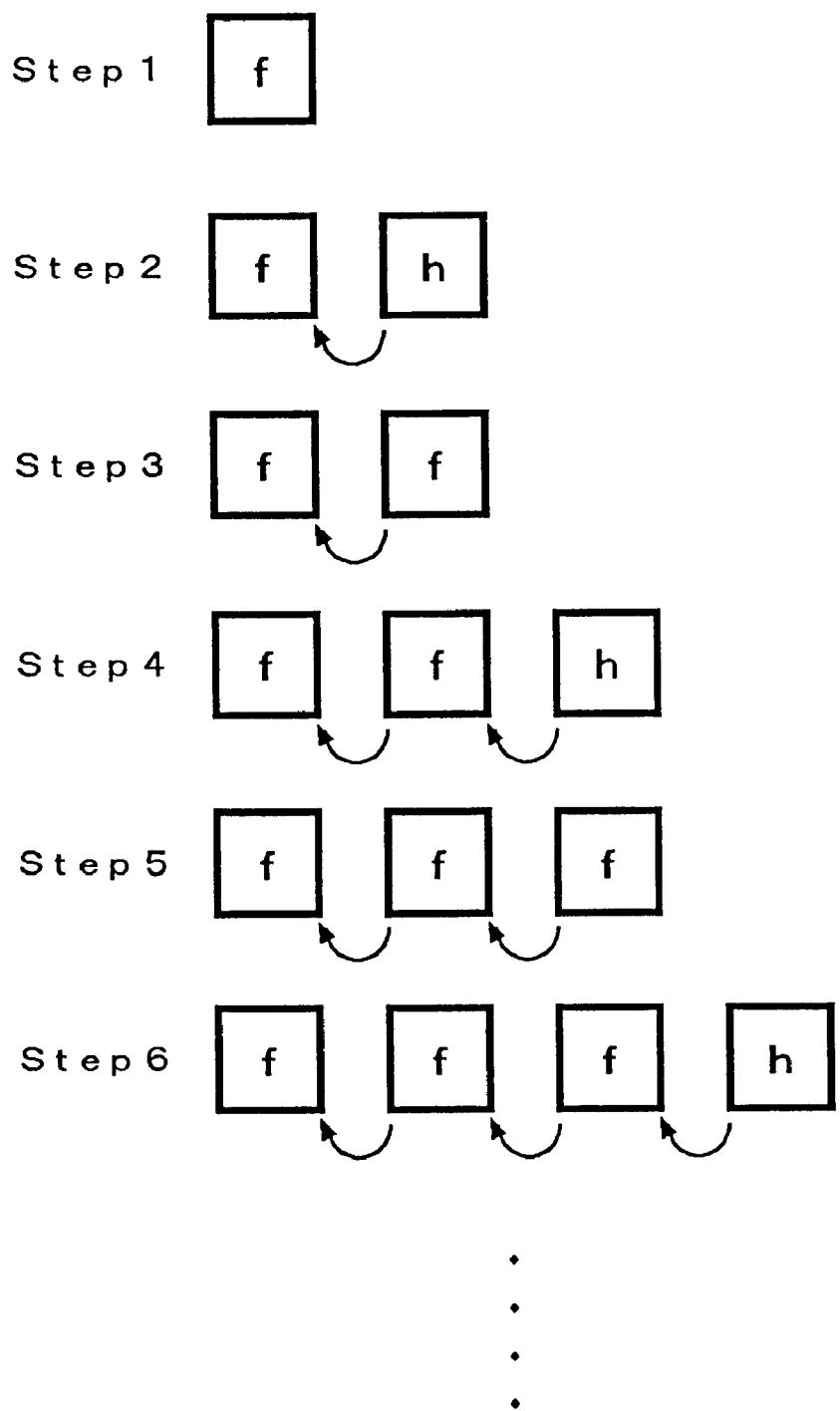
FIG. 2 is a diagram showing the conventional (Table 1) stack status.

If Table 1 is executed, a frame such as FIG. 2 is generated on a stack. That is, a frame about method f is generated in step 1 while a frame about method h is generated in step 2. The pointer points to the preceding method f. In addition, as execution of method h is over and method f is recursively invoked in step 3, the frame of method h disappears and one more frame of method f is made. The pointer points to the frame of the preceding method f. As recursively invoked method f invokes method h in it, a frame of method h is generated in step 4 and the pointer points to the frame of the preceding method f. When execution of method h is over, the frame of method h disappears and method f is recursively invoked again. Thus, the frame of method f in step 5 is generated. The pointer points to the frame of method f which invoked itself. Furthermore, as recursively invoked method f invokes method h in it, the frame of method h is generated. The pointer points to method f which invoked method h. Accordingly, frames of method f are generated one after another when Table 1 is executed.

Figure 3:
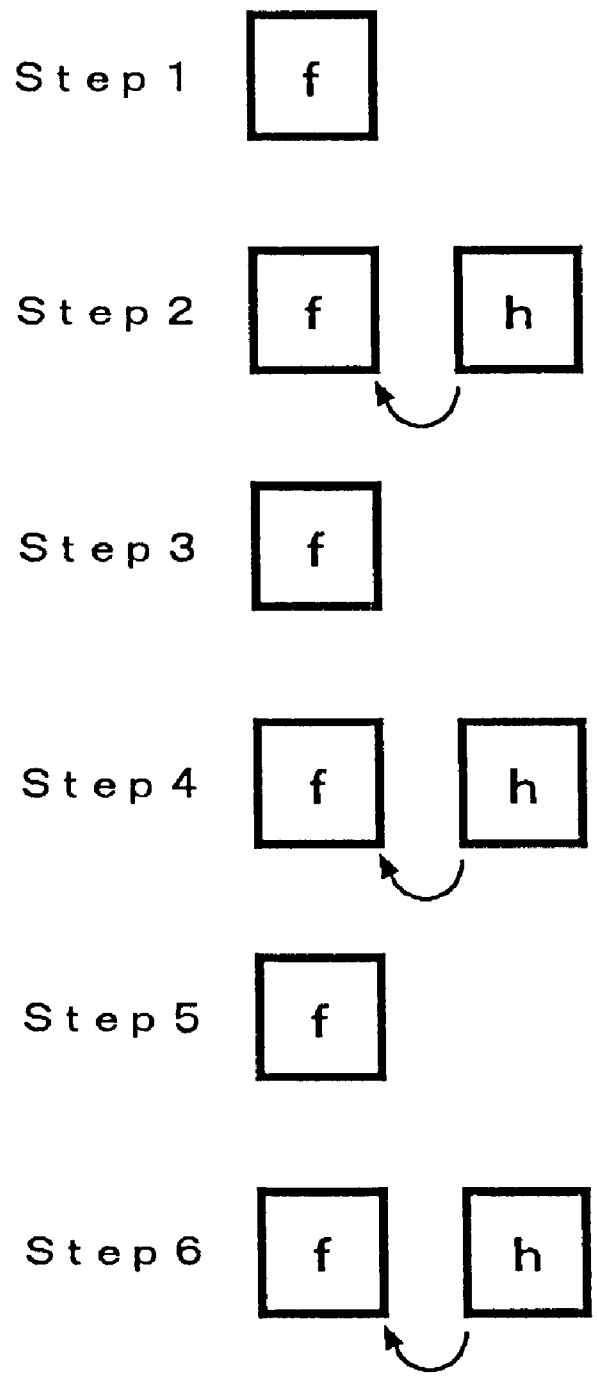
FIG. 3 is a diagram showing the stack status in Embodiment 1.

On the other hand, if Table 2 is executed, frames such as FIG. 3 are generated on a stack. That is, a frame about method f is generated in step 1 while a frame about method h is generated in step 2. The pointer points to the preceding method f. In addition, execution of method h is over and the frame of method h is erased in step 3. Then, as method f is no longer newly invoked, a new frame is not generated. In step 4, method h is invoked in a new iteration, so the frame of method h is generated again. When execution of method h is over, its frame is erased (step 5). If method h is invoked in a new iteration, the frame of method h is generated (step 6).

Thus, as stack information differs in step 3 and thereafter if FIG. 2 and FIG. 3 are compared, if currentDepth method, for instance, of SecurityManager class is invoked in method h, the returned depth value of the stack is naturally different in step 3 and thereafter.

Figure 4:
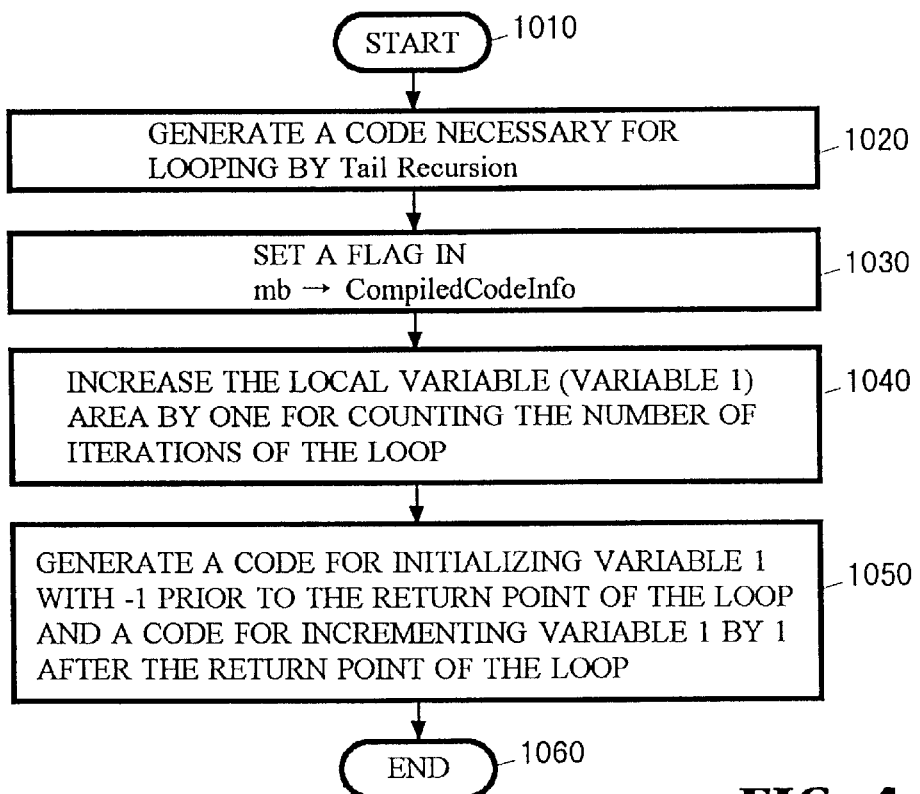
FIG. 4 is a flowchart showing the processing of JIT compiler in Embodiment 1.

In embodiment 1, the following process is executed in JIT compiler in order to fill this difference (FIG. 4). First, terms are defined for the following explanation. cb (class block): A pointer to a structure representing class information of Java. It can refer to all the method information belonging to the class (the following). mb (method block): A pointer to a structure representing method information of Java (methodblock). It has a pointer to cb of the class which the method belongs to. mbdCompiledCode: An area to set the head address of a compiled code. mbdCompiledCodeInfo: An area to set a flag for a method.

First, as shown in Table 2, the code necessary for looping by a tail recursion is generated (step 1020). Then, a flag is set in mbdCompiledCodeInfo in order to represent that this process is performed (step 1030). The local variable (variable 1 here) area is increased by one for counting the number of iterations of the loop (step 1040). As a local variable area is provided on a stack, it automatically means that a work area was provided on a stack. In addition, a code for initializing variable 1 with −1 prior to the return point of the loop and a code for incrementing variable 1 by 1 past the return point are generated (step 1050). It is as follows if represented by a bytecode.

Table 3
Starting Point of the Program
iconst_m1
istore<variable 1>
return point of the loop:
iinc<variable 1>1

It represents that −1 was put on a stack by iconst_m1 and that −1 was stored in variable 1 by istore. iinc represents that variable 1 is incremented by 1.

Table 4 shows how it is converted from Table 2 in order to make it easier to understand.

TABLE 4

```
400:   class test {
410:       public final int f( int x)
420:       {
430:           <variable 1>=−1
440:           for(;;) {
               //a code for looping generated by Tail Recursion
450:               <variable 1>++;
460:               if( x==0) {
470:                   return 0;
480:               } else {
490:                   h(x):
500:                   x=x−1;
               //a processing code generated by Tail Recursion
510:               }
520:           }
530:       public void h( int x)
540:       {
550:           ......
560:       }
570:   }
```

It shows that what corresponds to the code generated in step 1050 (FIG. 4) is represented in lines 430 and 450.

When the processing of FIG. 4 is executed and the necessary compiling process is performed, machine code 58 is generated. This machine code 58 is executed by CPU. When machine code 58 is executed, it is counted by variable 1 how many times method f was recursively invoked (depth of the stack) when method h was invoked in the original (Table 1) program.

Next, the operation of SecurityManager while stack trace is explained. First, the processing flow of SecurityManager if there is no difference from the code in FIG. 1 is shown in Table 5.

TABLE 5

```
int depth = 0;
for (sequentially tracing the frames in the stack)
{
    mb = taking out method information from the frames
    cb = mbdfb.class //acquiring a class from a method block
    if (cb is the object class)
    {
        <SecurityManager's process for cb>
        return depth;
    }
    depth ++;
}
```

First, method information is taken out from the frames and a class is acquired from a method block. If this class is the object class (the specified class), SecurityManager's process is performed. On the other hand, if it is not the object class, the depth value is incremented and the process is repeated for a next frame.

Then, SecurityManager of the present invention corrects the depth value by repeating the following process.

TABLE 6

```
int depth = 0;
for (sequentially tracing the frames in the stack)
{
    mb = taking out method information from the frames
    cb = mbdfb.class //acquiring a class from a method block
    if (cb is the object class)
    {
        <SecurityManager's process for cb>
        return depth;
    }
    else if (a flag of mbdCompiledCodeInfo is set)
    {
        //depth value of the stack not increased by Tail   Recursion is corrected
        depth += variable 1
    }
    depth ++;
}
```

A difference from Table 5 is the part where, if cb is not the object class, it determines whether a flag of mbdCompiledCodeInfo is set, i.e. whether the present invention is performed, and if a flag is set, the depth value of the stack not increased by Tail Recursion is corrected (depth+= variable 1 ). Thus, the difference between FIG. 2 and FIG. 3 can be filled by correcting the depth value which was counted by ordinary tracing with the counted value (variable 1).

(2) Embodiment 2 (Processing of Virtual Method Inlining Other Than a Tail Recursion)

Table 7 shows a sample program. It is a pseudocode.

TABLE 7

```
600:   class test {
610:       public void f ( int x )
620:       {
630:           for ( int i=0; i<x; i++ ) {
640:               g(i);
650:               h(i);
660:           }
670:       }
680:       public final void g ( int x )
690:       {
700:           h( x*x );
710:           h( x+x );
720:       }
730:       public void h ( int x )
740:       {
750:           ......
760:       }
770:   }
```

The line numbers are only for the purpose of the following explanation.

In the sample program of Table 7, method g is always executed when invoking method g since method g is given the final attribute and is not overridden any more. On the other hand, method h is a virtual method which is not given the final attribute, so it cannot specify the method to be actually executed at the time of compiling. Accordingly, it was formerly not possible to perform method inlining to such a program.

Table 8 shows a program after method inlining is performed.

TABLE 8

```
800:  class test {
810:    public void f ( int x )
820:    {
830:      for ( int i=0; i<x; i++ ) {
840:        h( i*i );
850:        h( i+i );
860:        h(i);
870:      }
880:    }
890:    public void h ( int x )
900:    {
910:      ........
920:    }
930:  }
```

Lines 840 and 850 are codes embedded by method inlining.

Figure 5:
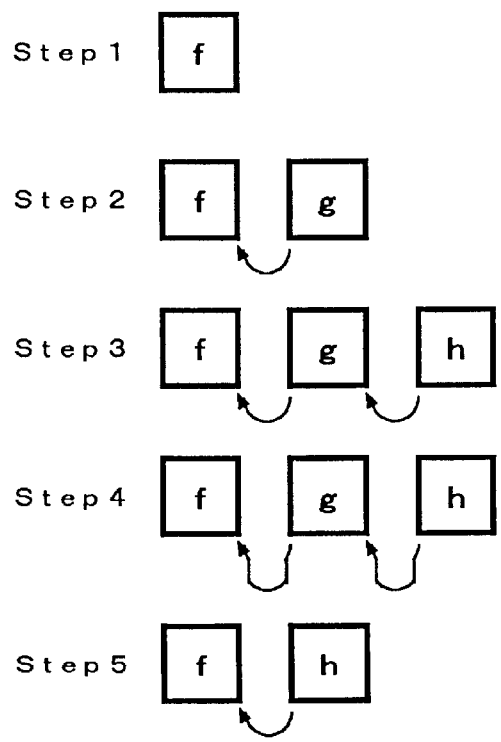
FIG. 5 is a diagram showing the conventional (Table 7) stack status.

Then, FIG. 5 shows a frame status of the stack in the event that this Table 7 is executed. If line 610 is executed (step 1), a frame of method f is generated. If line 640 is executed (step 2), a frame of method g is generated. As method g invokes method h, a frame of method h is generated (step 3). If method h of line 700 is executed, the frame of method h once disappears. As method h of line 710 is executed, however, the frame of method h is regenerated (step 4). If method h of line 710 is executed, the frame of method g disappears since execution of method g is over. After that, method h is invoked in method f so that a frame of method h is generated (step 5).

Meanwhile, FIG. 6 shows a frame status of the stack in the event that Table 8 is executed. While the initial step 1 is the same, method h is abruptly invoked since method g does not exist in Table 7 (line 840). Then, a frame of method h is generated (step 2). After that, it will be in the status of step 3 and step 4 in accordance with execution of method h in line 850 and execution of method h in line 860.

By seeing FIG. 5 and FIG. 6, it is understood that no frame related to method g is generated. SecurityManager may be invoked in method h which is invoked in execution of method g. In this case, it does not return the same result as before inlining.

So, JIT compiler executes a process as in FIG. 7. First, a flag of mbdCompiledCodeInfo is set in order to show that a process of the present invention is executed (step 1120). Next, it executes an inlining process (step 1130). At this time,, it detects method invocations whose invocation relationship to the end is not grasped. Such method invocations can be detected by recursively executing the inlining process to each method invocation. Namely, it can be determined by whether a method at the end which does not include a method invocation could be reached. For instance, in the program of Table 8, there are three methods h as a virtual method.

Then, invocation relationship information related to the method invocation detected by this step 1130 is generated and stored (step 1140). This invocation relationship information is, for instance, such as FIG. 8. Identification numbers are uniquely set for a method to be a base for method inlining and each inlined method. In this case, it is a tree structure where a method to be a base for inlining is a root, an inlined method is a node, and the invocation relationship between them is a link, wherein depth first search is sequentially performed from the root and the value is set while incrementing in postorder 1 by 1 from 0. Each line holds a method block mb of the method which invoked each of them and a pointer to the element which represents the invoking method in the invocation relationship information. Finally, a method block mb to be a base for inlining and null are stored. In the example of Table 8, there exist three invocations for method h as a virtual method not able to sufficiently grasp the invocation relationship (lines 840 to 860). The invocations in lines 840 and 850 are invocations from method g which are inlined while the invocation in line 860 is an invocation from method f itself. Accordingly, the method to be a base for inlining is method f, and the inlined method is method g. If this is made in postorder, method g is identification number 0 and method f is identification number 1. From the above, the invocation relationship information of Table 8 is described as follows.

0: {mb of method g, address of array element 1}
1: {mb of method f, null}

Furthermore, the head address of this array is stored immediately before a compiled code. Access to this array from method block mb can be obtained for instance, by setting an address on *(((long *)(mbdCompiledCode))−1). The following is explained on the assumption of such setting.

Then, in order to store the identification number of the method which performed method invocation, the local variable (variable 2) area is increased by one (step 1150). In addition, immediately before the method invocation detected in step 1120, a code for setting the identification number of the invoker of the method to variable 2 is generated (step 1160). As regards the example of Table 8, as the invocation of method h in lines 840 to 850 is an invocation by method g (the code of method g), a code for storing identification number 0 of method g in variable 2 is generated before the invocation of method h. In addition, as the invocation of method h in line 860 is performed by method f (a code of method f), a code for storing identification number 1 of method f in variable 2 is generated. It is represented by a bytecode as follows.

TABLE 9 iconst <identification number>
istore <variable 2>

This is generated in two locations in the example of Table 8. Namely after line 830 and after line 850.

To understandably represent the status after compilation as transformation of Table 8, it looks as follows.

TABLE 10

```
1300:  class test {
1310:    public void f ( int x )
1320:    {
1330:      for ( int i=0; i<x; i++ ) {
1340:        <variable 2> = 0;
1350:        h( i*i );
1360:        h( i+i );
1370:        <variable 2> = 1;
1380:        h(i);
1390:      }
1400:    }
1410:    public void h ( int x )
1420:    {
1430:      ........
1440:    }
1450:  }
```

In lines 1340 and 1370, codes for variable 2 which store information for tracing invocation relationships are generated.

When the processing of FIG. 7 is executed and the necessary compiling process is performed, machine code 58 is generated. This machine code 58 is executed by CPU.

When machine code 58 is executed, the information (identification number) of by which method it is invoked (a code of which method is executed) is stored in variable 2. Namely, it is invoked by method g (executing the code originally included in method g) in the event that 0 is stored in variable 2, and it is invoked by method f (executing the code originally included in method f) in the event that 1 is stored in variable 2.

Next, the processing of SecurityManager is explained. The conventional SecurityManager processes as represented in Table 5. On the other hand, the following represents the processing of SecurityManager in the present invention.

TABLE 11

```
1500:  int depth = 0;
1510:  for (sequentially tracing the frames in the stack)
1520:  {
1530:      mb = taking out method information from the frames
1540:      cb = mbdfb.class //acquiring a class from a method   block
1550:      if (a flag of mbdCompiledCodeInfo is set)
1560:  {
1570:      void * invocation relationship information array =    *(((long
*)(mbdCompiledCode))-1)
1580:      void * element address = invocation relationship     information
array[variable 2]
1590:      for ( ;element address!=NULL; element address=   element address[1]
) {
1600:         mb = element address[0];
1610:         cb = mbdfb.class;
1620:         if (cb is the object class)
1630:         {
1640:            <SecurityManager's process for cb>
1650:            return depth;
1660:         }
1670:         depth++;
1680:      }
1690:  }
1700:     else
1710:     {
1720:     if (cb is the object class)
1730:     {
1740:        <SecurityManager's process for cb>
1750:        return depth;
1760:     }
1770:  }
```

Figure 8:
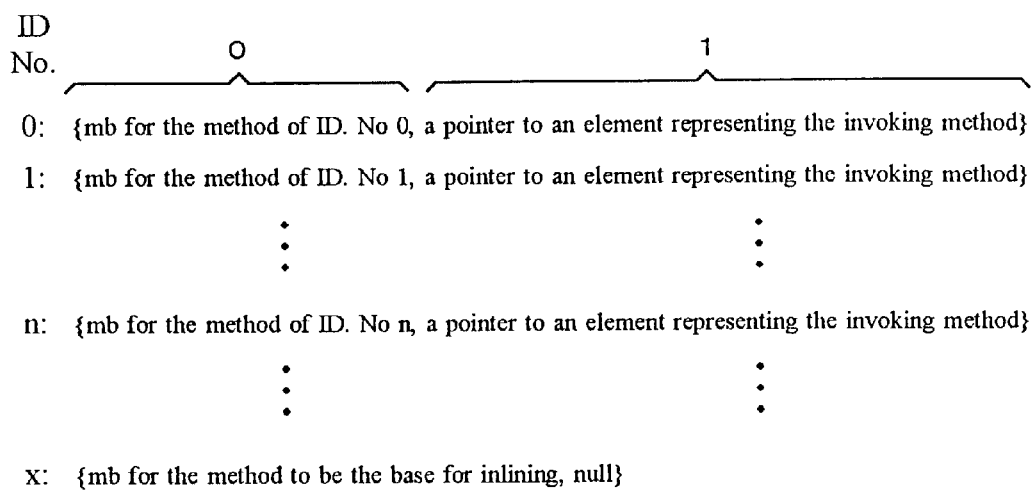
FIG. 8 is a diagram showing an array of invocation relationship information.

Method information is taken out from the examined frame in line 1530, and class information of the method is taken out from the method information in line 1540. Lines 1550 to 1690 are a part which is differently processed in the present invention. In line 1550, as aforementioned, it is determined by a flag whether or not the present invention is performed. In line 1570, as an array of invocation relationship information is stored immediately before the storage area of the method, its address is accessed. In line 1580, the element address of the identification number stored in variable 2 in the array of invocation relationship information is acquired. Line 1590 represents that it repeats up to line 1680 until the array element address becomes NULL, and each time it is repeated, the address of the array element representing the invoking method which is stored on the right of the array (an example of FIG. 8) becomes the array element address. Method block mb of the acquired array element address in line 1600 which is stored on the left column in the example of FIG. 8 is acquired, and the class of the method is acquired from the mb in line 1610. It is checked whether the class is the object class in line 1620. If it is the object class, SecurityManager's process is executed in line 1640. On the other hand, if it is not the object class, the depth value is incremented by 1 and it returns to line 1590. It is because the depth of the stack is also different as shown in FIG. 5 and FIG. 6.

The above-mentioned part is the different part from the conventional, and if the present invention is not performed, the same process as the conventional is to be executed (lines 1710 to 1770).

As above, the two embodiments of the present invention were separately mentioned, but the two can be simultaneously executed. For instance, a program such as Table 12 becomes a program such as Table 13.

TABLE 12

```
class test {
   public final init f ( int x )
   {
      if ( x==0 ) {
         return 0;
      } else
         g(x)
         h(x);
         return(x-1);
      }
   }
   public void g ( int x )
   {
      h ( x*x );
      h ( x+x );
   }
   public void h ( int x )
   {
      ......
   }
}
```

TABLE 13

```
class test {
    public void f ( int x )
    {
        <variable 1>=-1
        for (;;){
            <variable 1>++;
            if ( x==0 ) {
                return 0;
            } else
                <variable 2> = 0
                h( i*i );
                h(i+i );
                <variable 2> = 1
                h(i);
            }
        }
        public void h ( int x )
        {
        ......
        }
}
```

The present invention also relates to Jit compiler 56 in Java VM 52 and SecurityManager 60, and it is also possible to implement the whole or a part of Java VM 52, especially the part related to the present invention with hardware, especially a semiconductor chip.

In a language with a security facility such as Java, the scope of execution optimization by method inlining could successfully be expanded.

Method inlining in Java's JIT (Just In Time) compiler was successfully enabled.

In addition, it was also successful to enable stack information in a state where method inlining is not executed to reappear, when method inlining is executed.

It was also successful, in a language such as Java, to enable looping by a tail recursion for a method including an invocation of a method whose process after its invocation is indefinite and which includes a self recursion.

Furthermore, it was also successful to enable grasping of the number of iterations in the looping.

It was also successful to enable preservation of the invocation relationship information between methods before method inlining, when method inlining is executed.

It was also successful to enable determination of which method's code is being executed when method inlining is executed.

While the invention has been particularly shown and described with respect to preferred embodiments thereof, it will be understood by those skilled in the art that the foregoing and other changes in form and details may be made therein without departing form the spirit and scope of the invention.

Having thus described our invention, what we claim as new, and desire to secure by letters patent is:

1. A process for processing a program including a plurality of methods, comprising the steps of:
   generating a code necessary for looping by a tail recursion for a method including an invocation of a method whose process after its invocation is indefinite and which includes a self recursion; and generating a code for counting the number of iterations of the loop.

2. The process according to claim 1, wherein said step of generating said code for counting the number of iterations of the loop includes a step of generating a work area on a stack when executing said program.

3. The process according to claim 1, further comprising a step of generating a code for initializing the count of the number of iterations of the loop before said code necessary for the looping.

4. The process according to claim 1, further comprising a step of setting a flag which represents generation of said code necessary for the looping.

5. A process for detecting a depth of a frame associated with a specified method which satisfies a predetermined condition, in a storage area storing information with respect to executed methods as corresponding frames when a program including a first method is executed, said first method including an invocation of a method whose process after its invocation is indefinite and which includes a self recursion, said first method including a code necessary for looping by a tail recursion and a code for counting the number of iterations of the loop, said process comprising the steps of:
   determining whether a second method associated with a currently examined frame in said storage area is said specified method;
   if said second method is not said specified method, determining whether said second method is said first method; and if said second method is said first method, correcting a depth of a frame associated with said second method in said storage area by using the count value by said code for counting the number of iterations of the loop.

6. The process according to claim 5, further comprising a step of:
   if said second method is said specified method and a frame associated with said first method is already examined before examining a frame associated with the specified method, returning a corrected depth from an earliest frame in said storage area to a frame associated with said second method, said corrected depth corrected by the count value in said first method.

7. The process according to claim 5, further comprising a step of:
   if said second method is not said first method, adding 1 to said depth and changing said second method to a method associated with a next frame.

8. The process according to claim 5, wherein said first method includes a flag representing that said method contains said code necessary for the looping, and said step of determining whether said second method is said first method comprises a step of determining whether or not said flag exists.

9. A process for processing a program including a plurality of methods, comprising the steps of:
   inlining a code of a first method into a second method, said second method including an invocation of said first method whose process after its invocation is indefinite;
   getting invocation relationship information between said first and said second methods in a state before inlining said code of said first method, and storing said invocation relationship information into a storage area available later; and
   generating a code for storing information about said first method being executed when said code of the inlined first method is executed.

10. The process according to claim 9, further comprising a step of generating a code for storing information about said second method being executed when said code included in said second method before inlining is executed.

11. The process according to claim 9, wherein the invocation relationship between said first and said second methods includes a pointer pointing an item associated with said second method in an item associated with said first method.

12. A process for detecting a frame associated with a specified method which satisfies a predetermined condition in a storage area storing information with respect to executed methods as corresponding frames when a program including a plurality of methods is executed, said plurality of methods including a first method and a second method, said second method including an invocation of said first method whose process after its invocation is indefinite, wherein a code of said second method includes a code of said first method by the method inlining and a code for storing information about the first method being executed when said code of the inlined first method is executed, and said program includes the invocation relationship information between said first and said second methods in a state before inlining said code of said first method, said process comprising the steps of:

determining whether a third method associated with a currently examined frame in said storage area is said second method;

if said third method is said second method, getting said invocation relationship information associated with said second method;

getting a corresponding item of said third method in said invocation relationship information;

by using said corresponding item of said third method, getting an invoking method of said third method; and determining whether said invoking method is said specified method.

13. The process according to claim 12, further comprising a step of, if said invoking method is not said specified method, getting a further invoking method from a corresponding item of said invoking method in said invocation relationship information.

14. A computer for processing a program including a plurality of methods, said computer comprising:

a processor; and a storage device; wherein said storage device stores:

a first processing program for causing said processor to generate a code necessary for looping by a tail recursion for a method including an invocation of a method whose process after its invocation is indefinite and which includes a self recursion; and a second processing program for causing said processor to generate a code for counting the number of iterations of the loop.

15. A computer for detecting a depth of a frame associated with a specified method which satisfies a predetermined condition in a storage area storing information with respect to executed methods as corresponding frames when a program including a first method is executed, said first method including an invocation of a method whose process after its invocation is indefinite and which includes a self recursion, said first method including a code necessary for looping by a tail recursion and a code for counting the number of iterations of said loop, said computer comprising:

means for determining whether a second method associated with a currently examined frame in said storage area is said specified method;

means for determining whether said second method is said first method if said second method is not said specified method; and means for correcting the depth of a frame in said storage area associated with said second method by using the count value by said code for counting the number of iterations of the loop if said second method is said first method.

16. A computer for processing a program including a plurality of methods, said computer comprising:

a processor; and a storage device; wherein said storage device stores:

a first processing program for causing said processor to inline a code of a first method into a second method, said second method including an invocation of said first method whose process after its invocation is indefinite;

a second processing program for getting invocation relationship information between said first and said second methods in a state before inlining said code of said first method, and causing said processor to store said invocation relationship information into a storage area available later; and a third processing program for causing said processor to generate a code for storing information about said first method being executed when said code of the inlined first method is executed.

17. A storage medium for storing a processing program for causing a computer to process a program including a plurality of methods, said processing program comprising the steps of:

generating a code necessary for looping by a tail recursion for a method including an invocation of a method whose process after its invocation is indefinite and which includes a self recursion; and generating a code for counting the number of iterations of said loop.

18. The storage medium according to claim 17, wherein said step of generating said code for counting the number of iterations of the loop includes a step of generating a work area on a stack when executing said program.

19. The storage medium according to claim 17, said processing program further comprising a step of generating a code for initializing the count of the number of said iterations of the loop before said code necessary for the looping.

20. A storage medium for storing a processing program for causing a computer to detect a depth of a frame associated with a specified method which satisfies a predetermined condition, in a storage area storing information with respect to executed methods as corresponding frames when a program including a first method is executed, said first method including an invocation of a method whose process after invocation is indefinite and which includes a self recursion, said first method including a code necessary for looping by a tail recursion and a code for counting the number of iterations of the loop, said processing program comprising the steps of:

determining whether a second method associated with a currently examined frame in said storage area is said specified method; if said second method is not said specified method, determining whether said second method is said first method; and if said second method is said first method, correcting a depth of a frame associated with said second method in said storage area by using the count value by said code for counting the number of iterations of the loop.

21. The storage medium according to claim 20, said processing program further comprising a step of, if said second method is said specified method and a frame associated with said first method is already examined before examining a frame associated with the specified method, returning a corrected depth from an earliest frame in said storage area to a frame associated with said second method, said corrected depth corrected by the count value in said first method.

22. A storage medium for storing a processing program for causing a computer to process a program including a plurality of methods, said processing program comprising the steps of:

inlining a code of a first method into a second method, said second method including an invocation of said first method whose process after its invocation is indefinite;

getting invocation relationship information between said first and said second methods in a state before inlining said code of said first method, and storing said invocation relationship information into a storage area available later; and generating a code for storing information about the first method being executed when said code of the inlined first method is executed.

23. The storage medium according to claim 22, said processing program further comprising a step of generating a code for storing information about said second method being executed when said code included in said second method before inlining is executed.

24. A storage medium for storing a processing program for causing a computer to detect a frame associated with a specified method which satisfies a predetermined condition in a storage area storing information with respect to executed methods as corresponding frames when a program including a plurality of methods is executed, said plurality of methods including a first method and a second method, said second method including an invocation of said first method whose process after its invocation is indefinite, wherein a code of said second method includes a code of said first method by the method inlining and a code for storing information about the first method being executed when said code of the inlined first method is executed, and said program includes the invocation relationship information between said first and said second methods in a state before inlining said code of said first method, said processing program comprising the steps of:

determining whether a third method associated with a currently examined frame in said storage area is said second method;

if said third method is said second method, getting said invocation relationship information associated with said second method;

getting a corresponding item of said third method in said invocation relationship information; by using said corresponding item of said third method, getting an invoking method of said third method; and determining whether said invoking method is said specified method.

* * * * *